(12) United States Patent
Tsuda

(10) Patent No.: US 8,652,317 B2
(45) Date of Patent: Feb. 18, 2014

(54) METHOD OF FABRICATING AN ALUMINA NANOHOLE ARRAY, AND METHOD OF MANUFACTURING A MAGNETIC RECORDING MEDIUM

(75) Inventor: Kouichi Tsuda, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 1043 days.

(21) Appl. No.: 12/326,659

(22) Filed: Dec. 2, 2008

(65) Prior Publication Data

US 2009/0145769 A1  Jun. 11, 2009

(30) Foreign Application Priority Data

Dec. 5, 2007  (JP) .......................... PA 2007-314774

(51) Int. Cl.
- C25D 11/20  (2006.01)
- C25D 5/44  (2006.01)
- C23C 28/00  (2006.01)

(52) U.S. Cl.
USPC ............ 205/173; 205/190; 205/206; 205/223

(58) Field of Classification Search
USPC ................................. 205/190, 206, 223, 173
See application file for complete search history.

(56) References Cited

U.S. PATENT DOCUMENTS

| | | | | |
|---|---|---|---|---|
| 3,598,925 A | * | 8/1971 | Sakai et al. ..................... | 360/83 |
| 3,998,603 A | * | 12/1976 | Rairden, III ................... | 428/651 |
| 4,152,222 A | * | 5/1979 | Sheasby et al. ................ | 205/174 |
| 4,153,756 A | * | 5/1979 | Iwahana et al. ............... | 428/653 |
| 4,292,936 A | * | 10/1981 | Morishita et al. ........... | 123/193.6 |
| 5,011,554 A | * | 4/1991 | Fleischer ....................... | 148/430 |
| 5,455,001 A | * | 10/1995 | Hu ................................... | 419/38 |
| 2013/0004733 A1 | * | 1/2013 | Iwashita et al. ............... | 428/192 |

FOREIGN PATENT DOCUMENTS

| | | |
|---|---|---|
| CN | 1062805 A | 7/1992 |
| CN | 1278024 A | 12/2000 |
| JP | 61-261816 | 11/1986 |
| JP | 2003-045004 | 2/2003 |

(Continued)

OTHER PUBLICATIONS

H Silman et al., Protective and Decorative Coatings for Metals, Finishing Publications Ltd., Teddington, Middlesex, England, 1978, pp. 457.*

(Continued)

*Primary Examiner* — Patrick Ryan
*Assistant Examiner* — William Leader
(74) *Attorney, Agent, or Firm* — Rabin & Berdo P.C.

(57) ABSTRACT

An alumina nanohole array and a method of fabricating the same includes the steps of forming an aluminum thin-film on a substrate at a substrate temperature of −80° C. or below so that crystal grain growth is suppressed, even when a high-purity aluminum material is used, thus providing improved surface smoothness; and anodizing the aluminum thin-film. Preferably, the method additionally includes texturing by pressing a mold having an orderly array of projections against the aluminum thin-film to form pits on the aluminum thin-film which enables a larger array area to be formed. When the mold and the aluminum thin-film are held at a temperature of 150 to 200° C., the pressure used for pit formation is reduced. A magnetic recording medium manufactured by a method therefore includes forming a magnetic layer within the nanoholes so that the medium is suitable as a bit patterned media for a perpendicular recording system.

7 Claims, 4 Drawing Sheets

(56) References Cited

FOREIGN PATENT DOCUMENTS

| | | | |
|---|---|---|---|
| JP | 2003-069112 A | * | 3/2003 |
| JP | 2006-012249 | | 1/2006 |
| JP | 2007-276104 A | * | 10/2007 |

OTHER PUBLICATIONS

J. Gilbert Kaufman, Properties of Aluminum Alloys, The Aluminum Association, Washington, D.C., 1999, pp. 7-9, 162, 166.*

Thermally Assisted Magnetic Recording, Fujitsu, 58, No. 1, pp. 85-89 (2007).

Nanohole Patterned Media, Fujitsu, 58, No. 1, pp. 90-98 (2007).

Hideki Masuda, The Masuda "Nanohole Array" Project, Heisei 15 (2003) Kanagawa Academy of Science and Technology.

T. Yanagishita et al., Preparation of Ordered Nanohole Array Based on Anodization of Al Alloy, Spring 2004 Meeting of the Electrochemical Society of Japan.

S. Shingubara, Fabrication of nanomaterials using porous alumina template, Journal of Nanoparticle Research 5, pp. 17-30 (2003).

* cited by examiner

METHOD OF FABRICATING AN ALUMINA NANOHOLE ARRAY, AND METHOD OF MANUFACTURING A MAGNETIC RECORDING MEDIUM

CROSS-REFERENCE TO RELATED APPLICATION

This Application claims the benefit of the priority of Applicant's earlier filed Japanese Application PA 2007-314774 filed Dec. 5, 2007, the contents of which are incorporated herein by reference.

BACKGROUND OF THE INVENTION

1. Field of the Invention

The present invention relates to a method of producing an aluminum thin-film useful for constructing a variety of nanodevices, including a magnetic recording media built into various types of magnetic recording devices, such as external memory devices for computers. The invention additionally relates to a method of fabricating alumina nanohole arrays, and a method of manufacturing magnetic recording media, using the aluminum thin-film and the alumina nanohole array thus produced.

2. Description of the Related Art

The recent trend toward high-density memory in magnetic disks has been accompanied by a shift in the magnetic recording method from conventional in-plane recording (longitudinal recording) to perpendicular recording. The development of perpendicular recording methods has dramatically improved the recording density. With in-plane recording, the upper limit in the recording density was about 100 Gbits/in$^2$, whereas today the recording density has surpassed 400 Gbits/in$^2$.

However, the limit in the recording density attainable in the first-generation of simple perpendicular recording methods is 400 Gbits/in$^2$. The reason is as follows. Increasing the recording density requires that the bit size be made smaller. Yet, when the bit size is decreased, bit deterioration due to thermal fluctuations, i.e., random inversions of magnetization, has a tendency to arise. Satisfying formula (1) below is a necessary condition for avoiding bit deterioration due to such thermal fluctuations.

[E1]
$$\frac{K_u V}{kT} > 60 \quad (1)$$

In formula (1), $K_u$ is the uniaxial magnetic anisotropy constant, V is the volume per bit of the magnetic recording layer, k is the Boltzmann constant, and T is the absolute temperature. The right side of formula (1) is called the thermal stability index.

That is, to overcome the instability of thermal fluctuations arising from the inevitable decrease in volume V as the bit size is made smaller, it is necessary to increase the thermal stability index. If the operating temperature is fixed, the uniaxial magnetic anisotropy constant $K_u$ value must be increased.

$K_u$ is a constant that depends on the magnetic material and for which a relationship like that in formula (2) holds.

[E2]
$$H_c = \frac{2K_u}{M_s} - M_s(N_z - N_y) \quad (2)$$

Here, $H_c$ is the magnetic coercivity, $M_s$ is the saturation magnetization, and $N_z$ and $N_y$ are demagnetization coefficients in, respectively, the z direction and the y direction.

It is apparent from above formula (2) that the magnetic coercivity $H_c$ has a positive correlation with $K_u$. That is, if, as mentioned above, a magnetic material having a large $K_u$ is selected in order to overcome thermal fluctuations, the magnetic coercivity $H_c$ representing the magnetic field strength which reverses magnetization also increases, making it more difficult for the magnetic head to reverse the magnetization, and in turn making information more difficult to write to the magnetic recording medium. Such challenges as (1) the "decrease in volume associated with higher density", (2) the "long-term stability of recordings to thermal fluctuations", and (3) the "difficulty of recording due to a higher magnetic coercivity He" are all complexly intertwined, presenting a "trilemma" that makes it impossible, by the mere extension of earlier approaches, to arrive at a solution for achieving higher density recording.

A number of methods have been proposed recently for resolving such a trilemma. Of these, one promising method is thermally assisted magnetic recording.

Thermally assisted magnetic recording resolves the above trilemma by overcoming (3) the "difficulty of recording due to a higher magnetic coercivity $H_c$" without addressing the other two challenges. Specifically, at the very moment that information is written with a magnetic head to a magnetic recording medium which uses a high $H_c$ material, the magnetic recording medium is heated by a short period of irradiation with light so as to lower, for a short time, the $H_c$ of the recording medium, thereby making it possible to carry out writing even with a low magnetic field. The long-term stability to thermal fluctuations can be ensured by cooling once more to the read temperature within a short enough time that bit deterioration due to thermal fluctuations does not occur.

In this way, research and development has begun on a thermally assisted magnetic recording system prototype as a next-generation perpendicular recording system, and there are indications that it may be theoretically possible to achieve a recording density in excess of 1 Tbits/in$^2$. Thermally assisted magnetic recording theoretically has a large potential, and is thus a promising candidate for next-generation perpendicular recording systems (see, for example, Japanese Patent Application Laid-open No. 2006-12249; Japanese Patent Application Laid-open No. 2003-45004; and Fujitsu, 58, No. 1, pp. 85-89 (2007)).

However, careful investigations targeted at practical development have revealed a number of difficulties.

For example, if the magnetic recording medium is a continuous medium like the magnetic films that have hitherto been used, difficulties that may occur during such heating include (1) a rise, as well, in the temperature of neighboring bits and (2) the failure to achieve sufficient magnetic separation.

Solving the above difficulties is possible if the bits can be thermally isolated at the same time that they are magnetically isolated. Attempts are thus being made to employ the concept known as "bit patterned media" (BPM) targeted at the magnetic isolation of all of the bits.

Several approaches have been proposed for bit patterned media, one of them being bit patterned media which utilize alumina nanoholes (alumina=aluminum oxide). Although patent applications relating to alumina nanoholes have been filed for many years (see, for example, Japanese Patent Application Laid-open No. S61-261816; *Fujitsu*, 58, No. 1, pp. 90-98 (2007); *Heisei* 15 (2003) *Kanagawa Academy of Science and Technology, The Masuda "Nanohole Array" Project Research Report;* and *Abstracts of the Spring* 2004 *Meeting of the Electrochemical Society of Japan*, item 1 A28), a technical reassessment of BPM which utilize alumina nanoholes is taking place today. This is due, in particular, to the shift from conventional in-plane magnetic recording to perpendicular magnetic recording and to the intense desire for magnetic recording media having recording densities in excess of 1 Tbits/in$^2$.

Alumina nanoholes differ from other BPM-forming methods in that they have the following characteristics (a) to (c).

(a) A mold of metal or the like in which a regulated array of innumerable projections have been created by microfabrication is pressed against an aluminum thin-film to form micropits which then serve as the starting points for anodization wherein alumina nanoholes are formed in a self-organizing manner.

(b) The alumina nanoholes are a group of nanoholes that exist in a controlled array and are separated by alumina. By filling these nanoholes with a magnetic material using an electroplating process or the like, a magnetic recording medium in which one nanohole corresponds to one bit can be formed.

(c) Because the alumina in which alumina nanoholes have been formed is a material that is nonmagnetic and has a very low thermal conductivity, the individual bodies of magnetic material filled into the respective nanoholes can be both magnetically and thermally isolated, resulting in an ideal structure for thermally assisted BPM processes.

Yet, even in alumina nanoholes having such outstanding characteristics, a number of difficulties have emerged from further investigations.

One such difficulty has become apparent in the course of efforts to increase the purity of the aluminum starting material for aluminum film formation and reduce impurities with the aim of forming nanoholes having a diameter of about 20 nm with minimal defects. That is, as indicated also in *Abstracts of the Spring* 2004 *Meeting of the Electrochemical Society of Japan*, item 1 A28, the higher the purity of the aluminum starting material, the greater the tendency for crystal grain growth to proceed in the aluminum film thus formed, resulting in a marked loss in the surface smoothness of the film and thus making it difficult to uniformly form pits of several nanometers in depth as starting points for alumina nanoholes.

To cite one example, when an aluminum thin-film having a thickness of 100 nm is formed at room temperature on a silicon substrate using an aluminum target of 99.99% purity, the arithmetic average roughness (Ra) attains a value of 2 nm. At an Ra value of 2 nm, the surface has a maximum roughness (Rmax) of generally 15 nm. Even if an attempt were made to form pits having a depth of several nanometers at intervals of 20 nm on an aluminum thin-film with such an irregular surface, the excessively large surface irregularities would make it impossible to obtain uniform pits.

A way has thus been sought to suppress crystal grain growth during film formation so as to improve surface smoothness and reduce the surface irregularity on an aluminum thin-film so that, for example, Rmax is 3 nm or less. For example, *Abstracts of the Spring* 2004 *Meeting of the Electrochemical Society of Japan*, item 1 A28, describes an attempt to suppress crystal grain growth by an alloy process involving the addition of impurities to aluminum. This reference describes the addition of from 2 to 10 wt % of magnesium to form Al—Mg alloys. Moreover, at the moment, when nanohole formation efforts by most research laboratories are being targeted (1) at the formation of pits using a mold or die on a small-diameter substrate having a diameter of about one inch, or (2) at the formation of pits in local regions on a 2.5-inch substrate, harmful effects due to the use of Al—Mg alloys have not been noted in particular.

However, as is explained in greater detail later in this specification, the inventor has discovered that, in a crystal grain growth suppressing method involving an alloy process in which impurities are added to aluminum, the Vickers hardness of the aluminum thin-film increases, as a result of which the pressure needed to form the pits that serve as the starting points for the alumina nanoholes is three to four times that needed for pure aluminum. There is thus a tendency for wear and damage of the metal projections to occur, predictably shortening the life of the mold or die. An additional concern is the larger molding equipment required for the pit-forming operation.

SUMMARY OF THE INVENTION

It is therefore an object of the present invention to provide a method of fabricating an alumina nanohole array using an aluminum thin-film, wherein crystal grain growth during film formation can be suppressed even when a high-purity aluminum material is used, thus giving the formed thin-film an improved surface smoothness. Another object of the invention is to provide a method of manufacturing a magnetic recording medium using such an alumina nanohole array.

A preferred object of the invention is to provide a method of fabricating an alumina nanohole array which is able to improve the surface smoothness of the aluminum thin-film that is formed and is able at the same time to further reduce the pressure used to form pits for forming the alumina nanoholes, thus enabling the life of the mold made of metal or the like to be extended and enabling the size of the molding equipment to be reduced. Another preferred object of the invention is to provide a method of manufacturing a magnetic recording medium using such an alumina nanohole array.

In a first aspect, the invention relates to a method of fabricating an alumina nanohole array, which method includes the steps of:

(1) forming an aluminum thin-film on a substrate at a substrate temperature of −80° C. or below, and (2) anodizing the aluminum thin-film to provide the alumina nanohole array; and to an alumina nanohole array fabricated by such a method.

In a second aspect, the invention relates to a method of fabricating an alumina nanohole array, which method includes the steps of:

(1) forming an aluminum thin-film on a substrate at a substrate temperature of −80° C. or below, (2) texturing the aluminum thin-film by pressing a mold having thereon an orderly array of projections against the aluminum thin-film to form pits on the aluminum thin-film, and (3) anodizing the aluminum thin-film to provide the alumina nanohole array; and to an alumina nanohole array fabricated by such a method.

In a third aspect, the invention relates to a method of manufacturing a magnetic recording medium, which method includes the step of forming a magnetic layer within nanoholes defined in the alumina nanohole array fabricated in the above-described manner, and to a magnetic recording medium manufactured by such a method.

By employing the inventive method of fabrication, even when high-purity aluminum, for example, is used as the aluminum material, the maximum surface roughness (Rmax) of the aluminum thin-film can be held to a low value.

Preferably, by using high-purity aluminum as the aluminum material, the Vickers hardness of the aluminum thin-film can be held to a low value.

Also, it was found that when micropits are formed by using a mold or die to press against a high-purity aluminum thin-film produced in this way, a pressing force at a temperature between 150° C. and 200° C., which is only 50% of the pressing force required to shape the same high-purity aluminum thin-film at room temperature, suffices. As a result, it is possible to extend the life of the mold or die and reduce the size of the molding equipment, enabling the manufacture of low-cost alumina nanohole BPM-type data recording media that can be stably supplied.

By utilizing the micropits in an aluminum thin-film obtained in this way, an array of alumina nanoholes arranged at 20 nm intervals over the entire surface of a 2.5-inch substrate can be obtained. By filling this nanohole array with a magnetic material, a bit patterned medium having a single bit size of 20 nm can be manufactured.

DESCRIPTION OF THE PREFERRED EMBODIMENTS

I. First Aspect of the Invention

Figure 1:
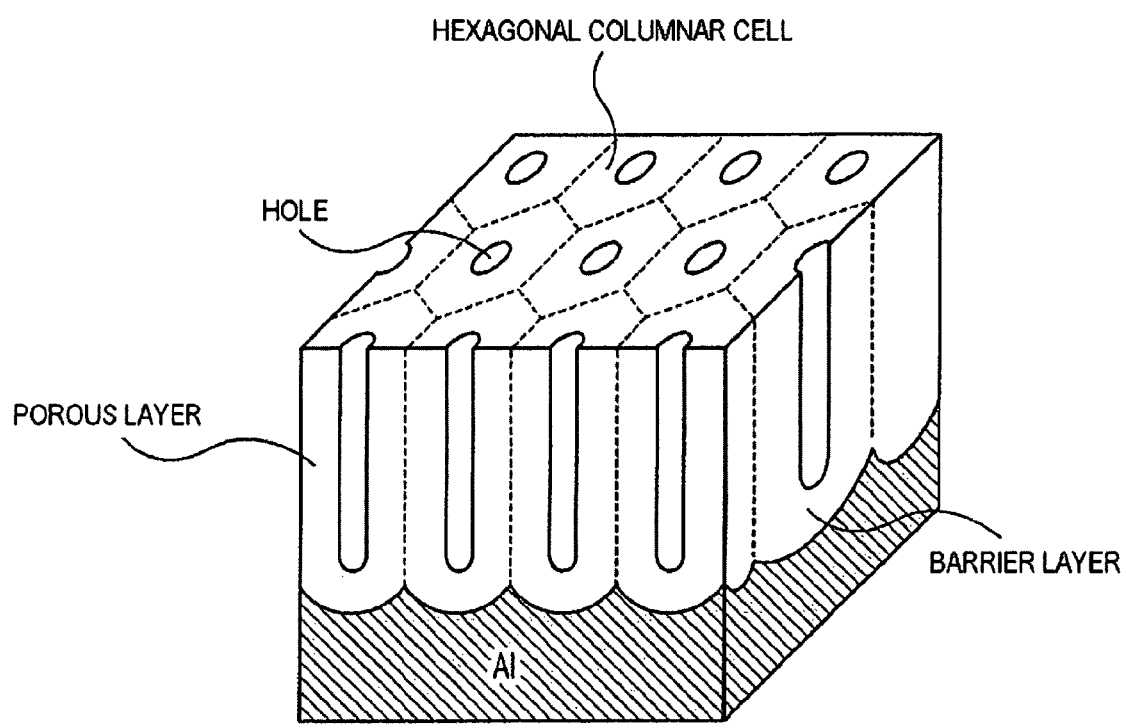
FIG. 1 is a schematic view of alumina nanoholes.

The first aspect of the invention provides a method of fabricating an alumina nanohole array, which method includes the steps of:

(1) forming an aluminum thin-film on a substrate at a substrate temperature of −80° C. or below, and (2) anodizing the aluminum thin-film to provide the alumina nanohole array; and also provides an alumina nanohole array fabricated by such a method.

A. Step (1):

(a) In step (1), an aluminum thin-film is formed on a substrate at a substrate temperature of −80° C. or below.

(b) As briefly mentioned above, the inventor, in attempting to form pits in an aluminum thin-film with a mold over the entire surface of a 2.5-inch substrate, discovered that the pressure required to form pits over the entire surface of high-purity aluminum was 200 kg, whereas the pressure required to form pits over the entire surface of an aluminum thin-film to which 8 wt % of magnesium had been added, as in *Abstracts of the Spring* 2004 *Meeting of the Electrochemical Society of Japan*, item 1 A28, was 800 kg, which is four times higher.

On examining the reasons for this, it became clear that the addition of impurities such as magnesium to aluminum, even in very small amounts, abruptly raises the Vickers hardness, making it necessary to apply a higher force when forming pits. A higher aluminum alloy thin-film hardness has a number of harmful effects, such as causing wear and damage to the pit-forming projections in the mold and requiring the use of larger molding equipment.

Hence, the purpose of the present step is to make it possible to obtain surface smoothness on an aluminum thin-film created on a substrate using, for example, high-purity aluminum as the aluminum material instead of resorting to a method involving the addition of impurities.

(c) The inventor has found that a Rmax of 3 nm or less can be achieved at a substrate temperature during aluminum film formation of −80° C. or below, even when high-purity aluminum material is used (see Example 1 below and FIG. 2). At the same time, the inventor has confirmed that the Vickers hardness of an aluminum thin-film formed at such a temperature is about 0.78 GPa, which is substantially unchanged from the Vickers hardness of an aluminum film formed at room temperature (see Example 2 below and FIG. 3).

Therefore, according to this aspect of the invention, it is possible to achieve good surface smoothness in an aluminum thin-film without necessarily using the approach of adding impurities described in *Abstracts of the Spring* 2004 *Meeting of the Electrochemical Society of Japan*, item 1 A28, which has the undesirable effect of abruptly increasing the Vickers hardness.

The term 'substrate temperature' refers herein to a substrate temperature which is controlled with a sensor such as a temperature-measuring resistor mounted on the surface of a stage to which the substrate is attached, and which is obtained by correcting for the difference between the true substrate temperature and the stage surface temperature.

(d) Preferred use can be made of a silicon single-crystal substrate as the substrate on which an aluminum thin-film is formed in the present step. However, advantageous use may even be made of an insulation material, such as a glass substrate, by depositing a conductive thin-film of gold or the like on the surface prior to aluminum thin-film formation and thereby keeping special problems from arising in the subsequent step of anodizing treatment for fabricating the alumina nanoholes.

(e) Common methods that may be used to form an aluminum thin-film on the substrate in the present step include various known metal thin-film-forming methods, such as resistance-heating deposition, electron-beam vapor deposition and atomic layer deposition. However, from the standpoint of such concerns as the ability to obtain a film having a high adhesion, good reproducibility and the like, the use of a sputtering process is preferred.

In a sputtering process, the metal to be formed into a thin-film is placed as the target within the vacuum chamber and bombarded with a rare gas, e.g., argon, ionized by the application of a high voltage. Atoms at the surface of the target are knocked off the target by such collisions and travel to the substrate, enabling film formation to occur.

(f) It is preferable for the purity of the aluminum material serving as the starting material for the aluminum thin-film to be selected in such a way that harmful effects, including a greater tendency for mold wear or damage to occur during the subsequent texturing step and an inability to make the alumina nanoholes uniform, will not arise due to an increase in the Vickers hardness of the aluminum thin-film formed. From the standpoint of the life of the mold in the subsequent texturing step and the uniform formation of alumina nanoholes, the use of high-purity aluminum, and specifically one having a purity of at least 99.9%, is preferred. From the standpoint of economic considerations, a purity of 99.999% may be regarded as necessary and sufficient.

(g) In this step, an aluminum thin-film having a thickness of from 10 to 3,000 nm may be obtained.

B. Step (2):

In Step (2), an alumina nanohole array is fabricated by anodizing the aluminum thin-film that has been formed in above Step (1).

(a) Anodizing an aluminum thin-film in sulfuric acid, oxalic acid, phosphoric acid or the like results in the formation of, as shown in FIG. 1, a porous anodized layer comprised of alumina and comprised of both a porous layer having innumerable holes perpendicular to the aluminum thin-film and a rounded barrier layer present at the bottom of the holes and in contact with the aluminum thin-film.

The porous anodized layer has a hexagonal cell structure. The diameter of the hexagonal cells can be controlled by the applied voltage; increasing the applied voltage increases the diameter. The film thickness is controlled by the anodizing time and the current density. Increasing the anodizing time and/or current density enables the layer thickness to be increased. As a result, the depth of the nanoholes formed in the porous layer also increases. The diameter of the nanoholes formed in the alumina hexagonal cells can be regulated independent of the anodizing conditions by pore-widening treatment following anodization. Pore-widening treatment is generally carried out by about 5 to 10 minutes immersion in an aqueous solution of 0.5% sodium hydroxide.

In an alumina nanohole array produced in this way, because, as noted above, the diameter of the hexagonal cell structure is proportional to the applied voltage, in a region of about 1 micrometer square, the alumina nanoholes are arranged in an orderly array by self-organization in the manner shown in FIG. 1.

(b) The general conditions for anodization include immersing the aluminum thin-film in an electrolytic solution that is comprised of an acidic aqueous solution of, for example, oxalic acid, sulfuric acid or phosphoric acid, and that is maintained at a solution temperature ranging from 0 to 30° C., and applying a voltage ranging from 5 to 100 V to the aluminum thin-film.

II. Second Aspect of the Invention (a) The second aspect of the invention provides a method of fabricating an alumina nanohole array, which method includes the steps of:

(1) forming an aluminum thin-film on a substrate at a substrate temperature of −80° C. or below, (2) texturing the aluminum thin-film by pressing a mold having thereon an orderly array of projections against the aluminum thin-film to form pits on the thin-film, and (3) anodizing the aluminum thin-film to provide the alumina nanohole array; and also provides an alumina nanohole array fabricated by such a method.

That is, the present second aspect of the invention additionally includes, prior to the aluminum thin-film anodizing step of the above-described first aspect of the invention, a texturing step in which pits are formed on the aluminum thin-film by a mold having an orderly array of projections thereon.

(b) As earlier explained in the description of the first aspect of the invention, in the alumina nanohole array that is formed, alumina nanoholes are regularly arrayed as shown in FIG. 1 by self-organization within an approximately 1 micrometer square region. However, when an effort is made to form the alumina nanoholes on an aluminum thin-film that is larger in size than 1 micrometer square, the alumina nanoholes do not assume a perfectly ordered arrangement.

Hence, in cases where alumina nanoholes are to be formed in a well-ordered array on an aluminum thin-film having such a large size, it is desirable, as shown in S. Shingubara, *J. Nanoparticle Research* 5, pp. 17-30 (2003), to carry out a texturing step wherein a mold having small projections in the desired arrangement is pressed against the aluminum thin-film so as to form pits, and subsequently carry out the anodizing treatment.

At the start of anodization, the voltage selectively concentrates in the micropits that have been formed in the surface of the aluminum thin-film and, with these pits serving as the starting points, alumina nanohole formation occurs, resulting in the formation of an alumina nanohole array which corresponds to the small projections of the mold.

Here, illustrative examples of the material making up the mold having a regular array of projections include electroformed nickel, silicon, silicon carbide and quartz.

(c) In the present aspect of the invention, it is also advantageous for high-purity aluminum, and preferably aluminum having a purity of at least 99.9%, to be used as the aluminum material for the aluminum thin-film, and for pit formation by a mold on the aluminum thin-film formed at a substrate temperature of −80° C. or below to be carried out at a temperature of between 150° C. and 200° C.

Figure 4:
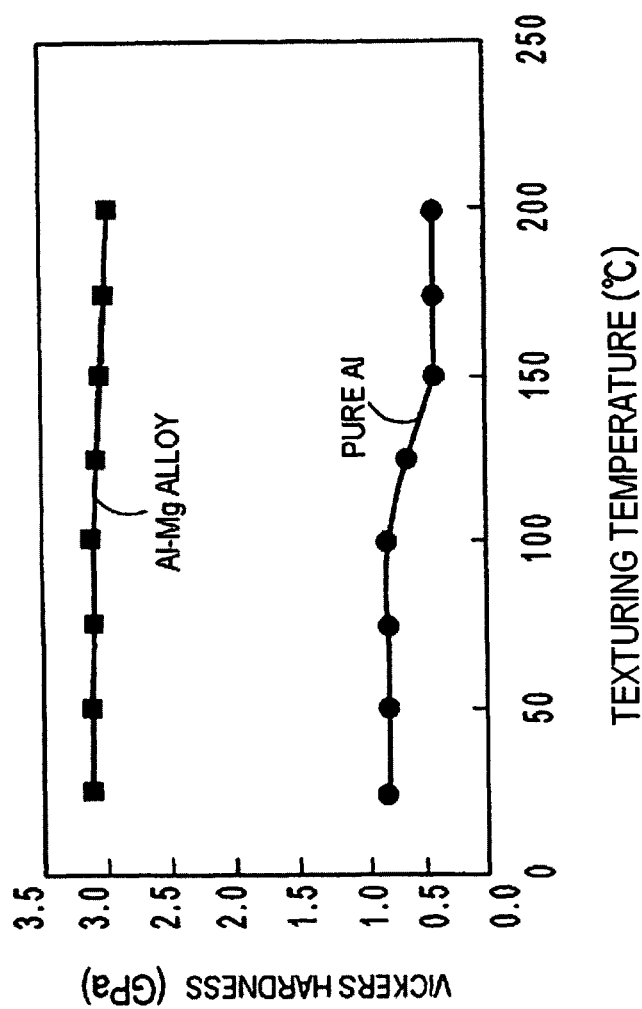
FIG. 4 is a graph showing the change in the Vickers hardness of the pure aluminum thin-film formed by the method of the invention with substrate temperature during texturing and, for reference, the corresponding change for an Al—Mg alloy thin-film according to the prior art.

That is, as noted above, an aluminum thin-film formed using an aluminum material with a purity of at least 99.9% has a Vickers hardness of 0.78 GPa, but the inventors have found that the Vickers hardness of an aluminum thin-film which exhibits such a low Vickers hardness undergoes a sudden and further decrease at a temperature of about 125° C., and at 150° C. becomes one-half of the Vickers hardness at room temperature (see Example 3 and FIG. 4). On the other hand, known aluminum films to which impurities such as magnesium have been added and which have a higher Vickers hardness do not undergo a large change in the Vickers hardness with temperature (see Example 3 and FIG. 4), thus confirming that the above-described additional reduction in Vickers hardness is a distinctive effect of the present invention.

Because oxidation at the surface of the aluminum thin-film can be suppressed by forming the pits in an oxygen concentration-controlled environment, a pit-forming temperature in excess of 200° C. is also possible. However, from the economic standpoint of eliminating the need for excessive equipment, it is preferable to select a pit-forming temperature of 200° C. or below.

In this way, by forming micropits on the aluminum thin-film at a pit-forming temperature of at least 150° C., and more preferably between 150° C. and 200° C., mold wear and damage can be further suppressed in the texturing step, enabling the life of the mold to be further extended. In fact, as shown in Example 4, even following 1,000 texturing operations, no mold deformation or damage was observed, making it possible to obtain pitted shapes substantially similar to those initially formed. By contrast, in prior-art Al—Mg (8 wt % Mg) thin-films, after 220 texturing operations, deformation or defects arose in about 5% of the small projections on the mold, marking the end of the useful mold life.

III. Third Aspect of the Invention (a) The third aspect of the invention provides a method of manufacturing a magnetic recording medium, which method includes the step of forming a magnetic layer within the nanoholes holes defined in the alumina nanohole array which can be fabricated according to the above-described first aspect of the invention, and more preferably according to the second aspect of the invention. The third aspect of the invention also provides a magnetic recording medium manufactured by such methods.

(b) Formation of the magnetic film on a magnetic recording medium for a hard disk drive (HDD) is generally carried out by a dry process such as sputtering. However, in the case of shapes such as alumina nanoholes which have a diameter of about 20 nm and a depth of from about 60 nm to about 100 nm, the magnetic material is unable to enter the nanoholes in a dry process. Hence, it is preferable to fill the magnetic material, such as Co—Pt, into the nanoholes by an electroplating process. Plating may be carried out by an alternating current process in which a mixed aqueous solution of cobalt sulfate and hexachloroplatinic acid is used as the plating solution.

(c) As mentioned above, following the formation of a magnetic layer in the holes in the alumina nanohole array, surface planarization and the formation of a diamond-like carbon (DLC) film and a lubricating film are carried out in this order. Evaluation of the magnetic properties, head glide characteristics, and read/write characteristics can be carried out on the magnetic recording material thus obtained (in Example 7, the magnetic recording material had Co—Pt filled alumina nanoholes).

As indicated also in Example 7, magnetic recording media having a performance which is suitable for thermally assisted magnetic recording can also be manufactured by the present invention.

EXAMPLES

The present invention is further illustrated by the following examples. It is to be understood that the present invention is not limited to the examples, and various changes and modifications may be made in the invention without departing from the spirit and scope thereof.

Example 1

Production of Aluminum Thin-Films

The aluminum thin-films used in the following examples were produced as follows.

In a sputtering apparatus having a substrate mounting stage equipped with a temperature control system composed of a liquid nitrogen feeder and a heater, a 2.5-inch silicon single-crystal substrate was mounted onto the substrate stage and film formation was carried out at various substrate temperatures. The aluminum target used for film formation had a diameter of 6 inches and a purity of 99.99%. The film-forming conditions were set to a film-forming time of 60 seconds and an aluminum film thickness of 100 nm.

Figure 2:
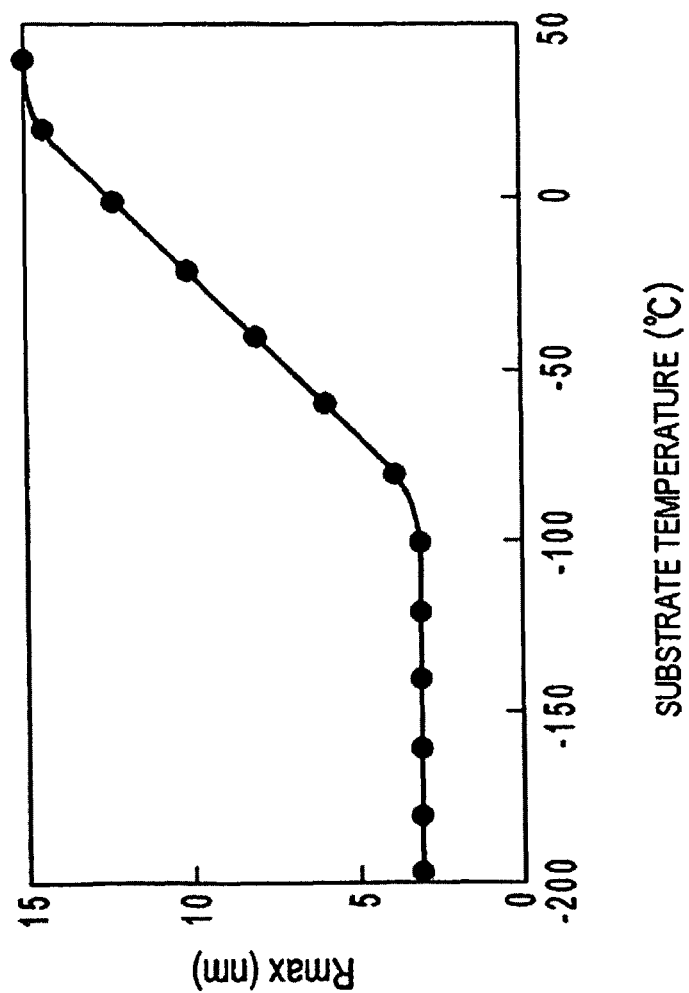
FIG. 2 is a graph showing the relationship, fundamental to the invention, between the substrate temperature and the maximum surface roughness Rmax of the aluminum thin-film.

FIG. 2 shows the measurement results for the maximum surface roughness (Rmax) of aluminum thin-films produced at substrate temperatures of from −196° C. (the temperature of liquid nitrogen) to 40° C. At substrate temperatures of −80° C. or below, the Rmax was about 3 nm, from which it was found to be possible to uniformly form pits of several nanometers over the entire surface of the substrate with a mold having pit-forming projections thereon.

Here, "Rmax" refers to the maximum height from a mean line for surface irregularities on the aluminum thin-film, as measured with an atomic force microscope (AFM).

Example 2

Figure 3:
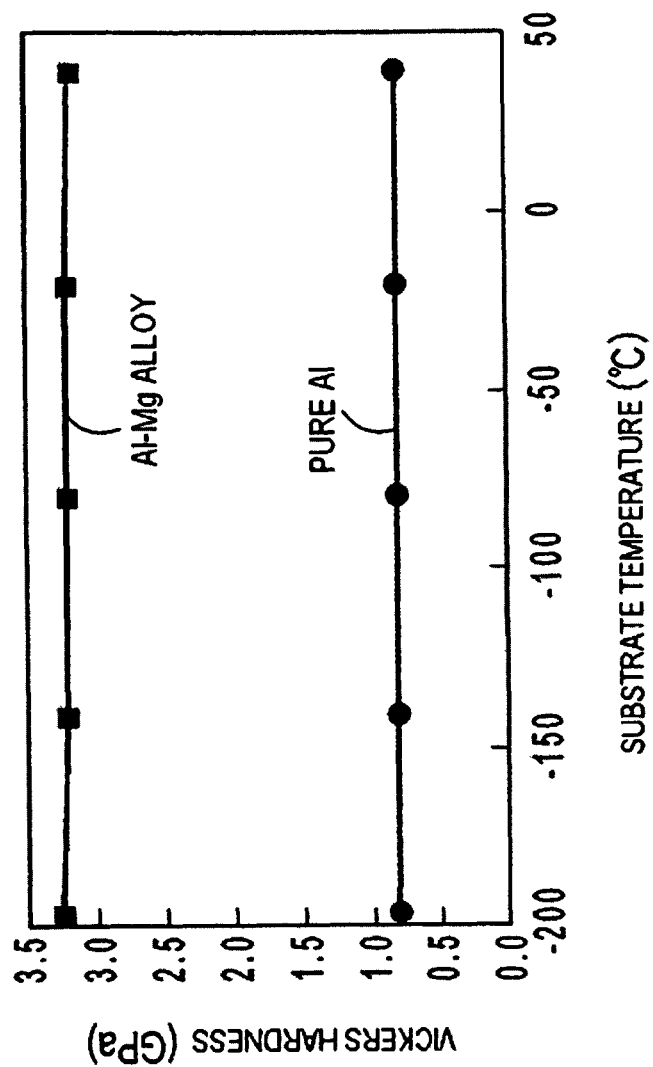
FIG. 3 is a graph showing the relationship between the substrate temperature and the Vickers hardness.

Substrate Temperature Dependence of Vickers Hardness of Aluminum Thin-Films Of the conditions shown in Example 1, the temperature dependency of the Vickers hardness for both a pure aluminum thin-film (example according to present invention) having a film thickness of 100 nm produced at a substrate temperature of −196° C. and for an Al—Mg (8 wt % Mg) thin-film (comparative example) having a film thickness of 100 nm produced at a substrate temperature of 30° C. in the same way as in Example 1, aside from the use of an aluminum target composed of Al—Mg (8 wt % Mg) instead of an aluminum target having a purity of 99.99%, were investigated. The results are shown in FIG. 3.

The Vickers hardness was found to be substantially constant, regardless of the substrate temperature. In the thin-films obtained in the example of the invention using pure aluminum, the Vickers hardness was about 0.78 GPa. By contrast, in the thin-film obtained in the comparative examples using an Al—Mg alloy (8 wt % Mg), the Vickers hardness was 3.1 GPa, which was four times that for the thin-film made of pure aluminum. In the latter case as well, the Vickers hardness did not change substantially with the substrate temperature.

These results demonstrate that, in the present invention, surface smoothness can be achieved while retaining the low Vickers hardness characteristics of pure aluminum.

Here, the Vickers hardness was measured with a standard micro-Vickers hardness tester.

Example 3

Pit-Forming (Texturing) Temperature Dependence of Vickers Hardness of Aluminum Thin-Films The pit-forming (texturing) temperature dependence of the Vickers hardness of the thin-film according to the invention produced using pure aluminum in Example 2, and of the Vickers hardness of the thin-film according to the comparative example produced using an Al—Mg (8 wt % magnesium) alloy were investigated. The results are shown in FIG. 4.

In the Al—Mg thin-film, the Vickers hardness did not decrease even when the temperature was raised to 200° C. By contrast, when an aluminum thin-film was produced from pure aluminum at a substrate temperature of −196° C. according to the present invention, the Vickers hardness decreased suddenly at a temperature of 100° C. or more and at a temperature of 150° C. to 200° C. became about 50% of the room-temperature value.

Based on this data, when molding was carried out while holding at 150° C. both the pit-forming mold and the pure aluminum thin-film having a film thickness of 100 nm produced at a substrate temperature of −196° C., as with the Vickers hardness, pit formation was possible even at a low pit-forming pressure. Here, the pit-forming pressure was 100 kg, which was one-half the pressure of 200 kg required at room temperature.

In the present invention, similar effects were confirmed at a substrate temperature of not only −196° C., but even at −80° C.

Example 4

Mold Durability Test in Aluminum Thin-Film Texturing Step

Pitted aluminum thin-films formed as described in Example 3 (film forming substrate temperature, −80° C.;

pit-forming temperature, 150° C.) were repeatedly manufactured using the same mold made of electroformed nickel, and the number of times pit formation can be carried out without mold deformation was experimentally determined.

As a result, when film formation was carried out at −80° C. and pit formation (texturing) was carried out at 150° C., the mold was able to retain the initial shape with substantially no mold deformation or damage up to 1,000 texturing operations. By contrast, when Al—Mg (8 wt % magnesium) thin-films according to the prior art were used, deformation or other defects arose in about 5% of the small projections in the mold after 220 texturing operations, marking the end of the useful mold life.

These results clearly demonstrate the effectiveness and utility of the present invention.

Example 5

Fabrication of Alumina Nanohole Array

Alumina nanohole formation was carried out by anodization on all the pitted aluminum thin-films according to the invention formed in Examples 1 and 2.

The solution used in anodization was an aqueous solution containing 3.5% oxalic acid, and treatment was carried out for 85 seconds while controlling the treatment conditions as follows: solution temperature, 5±1° C.; applied voltage, 18.8±0.1 V; current density, 10 mA/cm$^2$. This treatment produced an array of hexagonal cell structures of 20 nm diameter over the entire surface of a 2.5-inch substrate at a pitch of 20 nm.

The alumina nanoholes following anodizing treatment had a diameter of about 6 nm. To facilitate the entry of magnetic material into these nanoholes by plating, pre-widening treatment was carried out in which the alumina nanohole diameter was widened to 14 nm. Pore-widening treatment was carried out by immersing the anodized substrate for 5 minutes in an aqueous solution of 0.5% sodium hydroxide controlled to a temperature of 50±2° C.

Example 6

Manufacture of Magnetic Recording Medium (1)

Next, filling treatment was carried out in which the alumina nanoholes produced up until Example 3 were filled with a Co—Pt magnetic material by an alternating-current electroplating process.

Plating was carried out for 60 seconds by using a mixed aqueous solution containing 5% cobalt sulfate and 15% hexachloroplatinic acid as the plating solution while applying an alternating current of 10 V, thereby filling the alumina nanoholes with the Co—Pt magnetic material.

Because the cobalt and platinum are randomly arrayed after plating, to induce a phase change from this state to an L1$_0$ structure able to achieve a high K$_u$, heat treatment at 500° C. was carried out for 30 minutes in a vacuum. The magneto-optical Kerr effect for the heat-treated material was then measured. From the magnetic coercivity H$_c$ of this material, K$_u$ was confirmed to be 2×10$^6$ J/m$^3$, which is a value close to that for bulk Co—Pt having a L1$_0$ structure (K$_u$ for bulk Co—Pt=5×10$^6$ J/m$^3$).

Example 7

Manufacture of Magnetic Recording Medium (2)

In the magnetic recording medium manufactured in Example 6, the alumina nanoholes have been filled by a plating operation with the Co—Pt magnetic material, which is also present on the substrate surface.

To achieve a smooth surface, planarization by argon milling was carried out using an ion-beam etching system, following which a diamond-like carbon (DLC) film then a lubricating film were deposited on the surface.

The glide characteristics of the medium manufactured in this way were examined by carrying out a glide height test at a glide height of 10 nm. The results indicated that the glide characteristics of the bit patterned medium (BPM) manufactured in Example 6 from alumina nanoholes filled with magnetic material did not pose any problems.

Next, the magnetic characteristics were checked using a read/write head from which it was confirmed that magnetic write and read operations could be carried out.

Because the read/write head used here was quite large compared with the size of the alumina nanoholes (20 nm diameter), it was not possible to determine whether a single alumina nanohole corresponds to one bit. A magnetic force microscope (MFM) was thus used to confirm whether a single alumina nanohole corresponds to one bit, whereupon, as expected, a single alumina nanohole was indeed found to correspond to one bit.

Because the foregoing results confirm that the bit patterned media (BPM) manufactured by the procedures described in the above examples have 20 nm size alumina nanoholes which individually correspond to one bit and have K$_u$ values comparable to that of bulk Co—Pt magnetic material, these media can be regarded as having a performance which is suitable for thermally assisted magnetic recording.

The alumina nanohole arrays fabricated by the method of the invention are useful for constructing various nanodevices, and are especially suitable for manufacturing high-density magnetic recording media.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A method of fabricating an alumina nanohole array, comprising the steps of:
providing an aluminum substrate and cooling the aluminum substrate to a substrate temperature of −80° C. or below;
forming an aluminum thin-film having a purity of at least 99.9% on the aluminum substrate at the substrate temperature of −80° C. or below, which is a substrate temperature effective to form an aluminum thin-film having a smooth surface characterized as having an Rmax that is 3 nm or less;
providing a mold having thereon an orderly array of projections;
texturing the smooth surface of the aluminum thin-film by, in combination:
(a) holding the mold and the aluminum thin-film at a temperature ranging from 150° C. to 200°, which is a temperature effective to provide a Vickers hardness of the aluminum thin-film that is about one-half the Vickers hardness thereof at room temperature, and which is a temperature effective to suppress oxidation of the aluminum under an atmospheric environment, and (b) pressing the orderly array of projections of the mold against the aluminum thin-film to form pits in the aluminum thin-film; and anodizing the aluminum thin-film having pits formed therein to provide the alumina nanohole array.

2. The method of fabricating an alumina nanohole array according to claim 1, wherein anodizing the aluminum thin-film provides a porous anodized layer thereon comprised of alumina, and wherein the porous anodized layer comprises a porous layer having a plurality of holes in an orderly array extending perpendicular to the aluminum thin-film and a rounded barrier layer present at the bottom of the holes and in contact with the aluminum thin-film.

3. The method of fabricating an alumina nanohole array according to claim 1, wherein forming the aluminum thin-film on the substrate is accomplished by one of sputtering, resistance-heating deposition, electron-beam vapor deposition, and atomic layer deposition, and wherein the aluminum thin-film has a thickness ranging from 10 to 3,000 nm.

4. The method of fabricating an alumina nanohole array according to claim 1, wherein anodizing the aluminum thin-film is accomplished by immersing the aluminum thin-film in an electrolytic solution that is comprised of an acidic aqueous solution of one of oxalic acid, sulfuric acid or phosphoric acid and that is maintained at a temperature ranging from 0 to 30° C., and applying a voltage ranging from 5 to 100 V to the aluminum thin-film.

5. The method of fabricating an alumina nanohole array according to claim 2, further comprising conducting a pore-widening treatment after anodizing by immersing the aluminum thin-film in an aqueous alkali solution for an immersion time effective to widen the plurality of holes of the porous anodized layer.

6. A method of manufacturing a magnetic recording medium, comprising the steps of:

providing the alumina nanohole array according to the method of claim 1; and forming a magnetic layer within the nanoholes defined in the alumina nanohole array.

7. The method according to claim 6, wherein forming the magnetic layer is accomplished by electroplating.

* * * * *